United States Patent [19]

Fassauer

[11] Patent Number: 5,205,113
[45] Date of Patent: Apr. 27, 1993

[54] CUTTING APPARATUS MULCH RECYCLE SYSTEM

[76] Inventor: Arthur L. Fassauer, 420 Foster La., Canyon, Tex. 79015

[21] Appl. No.: 857,766

[22] Filed: Mar. 26, 1992

Related U.S. Application Data

[63] Continuation-in-part of Ser. No. 680,788, Apr. 3, 1991, Pat. No. 5,123,235, which is a continuation-in-part of Ser. No. 528,718, May 24, 1990, Pat. No. 5,101,615.

[51] Int. Cl.⁵ .............................................. A01D 53/00
[52] U.S. Cl. ....................................... 56/12.8; 56/12.9; 56/13.4
[58] Field of Search ............... 56/12.8, 12.9, 13.1–13.4, 56/320.1, 320.2

[56] References Cited

U.S. PATENT DOCUMENTS

| | | | |
|---|---|---|---|
| 4,276,737 | 7/1981 | Henning | 56/12.8 |
| 4,817,372 | 4/1989 | Toda et al. | 56/12.8 |
| 5,101,615 | 4/1992 | Fassauer | 56/12.8 |
| 5,113,642 | 5/1992 | Dunn | 56/12.8 |
| 5,123,235 | 6/1992 | Fassauer | 56/12.9 |

Primary Examiner—Thuy M. Bui
Attorney, Agent, or Firm—W. Kirk McCord; Daniel V. Thompson

[57] ABSTRACT

A cutting apparatus, such as a lawn mower is described comprising a substantially endless housing having an open bottom, air intake opening and a discharge port. The housing cooperates with a plate member projecting inwardly from a bottom part of the housing to define a substantially enclosed centrifuge chamber. A rotatable cutting blade is mounted in the chamber and an air impeller is provided for pressurizing air in the chamber. The plate member and impeller enhance the centrifugal movement imparted to the cuttings by the rotating cutting blade. A mulch recycling system is provided for receiving the grass cuttings and for delivering the cuttings to a predetermined location adjacent the housing for mulching. The mulch recycling system is adapted for use in connection with cutting apparatus supported by wheels, or roller members, as well as air-floated cutting apparatus.

30 Claims, 15 Drawing Sheets

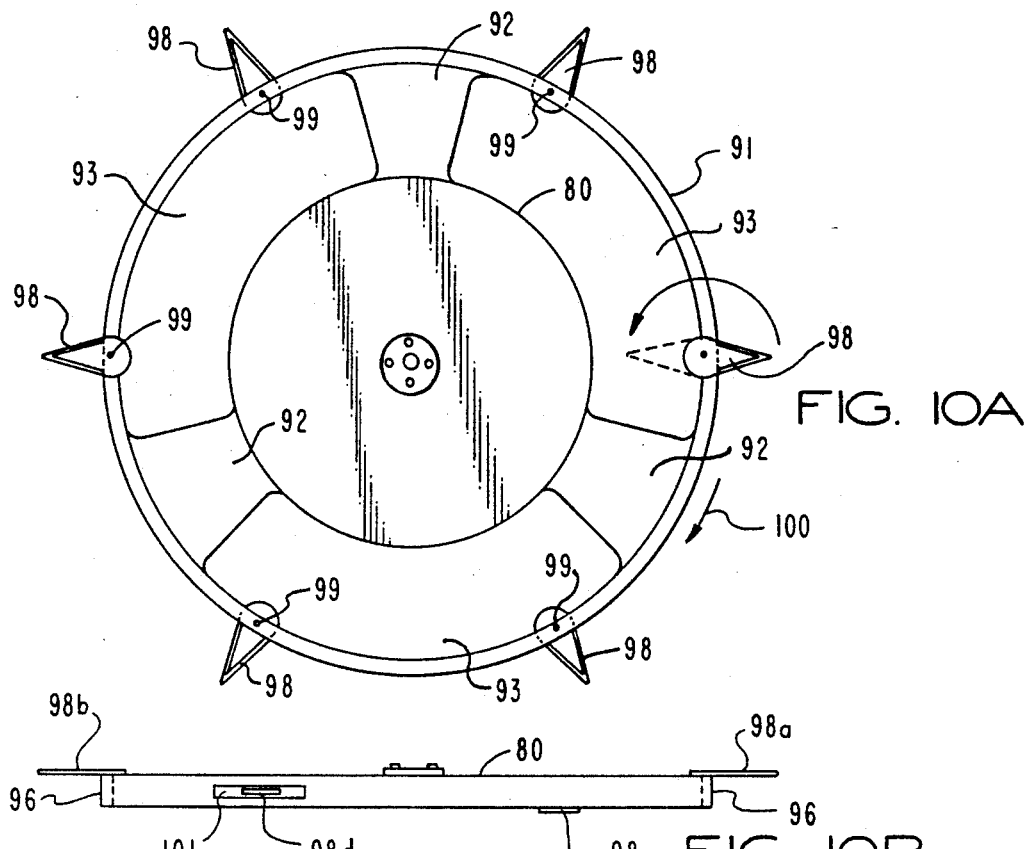
FIG. 10A
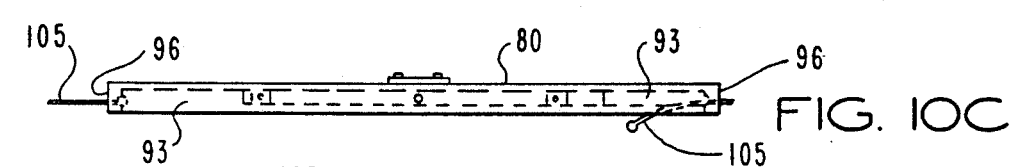
FIG. 10B
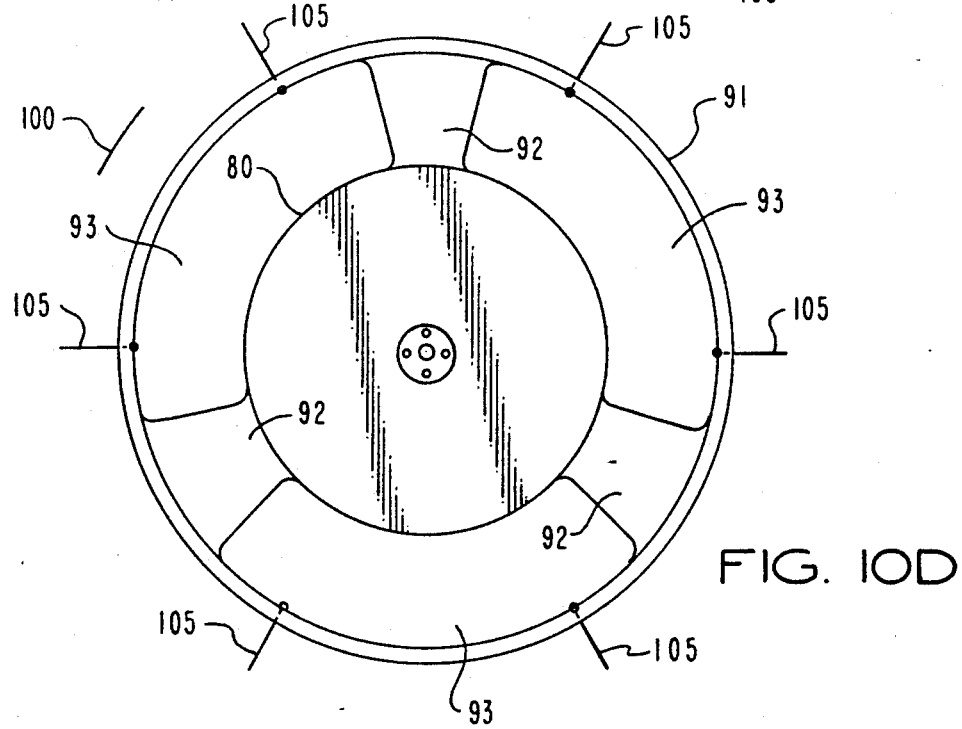
FIG. 10C
FIG. 10D

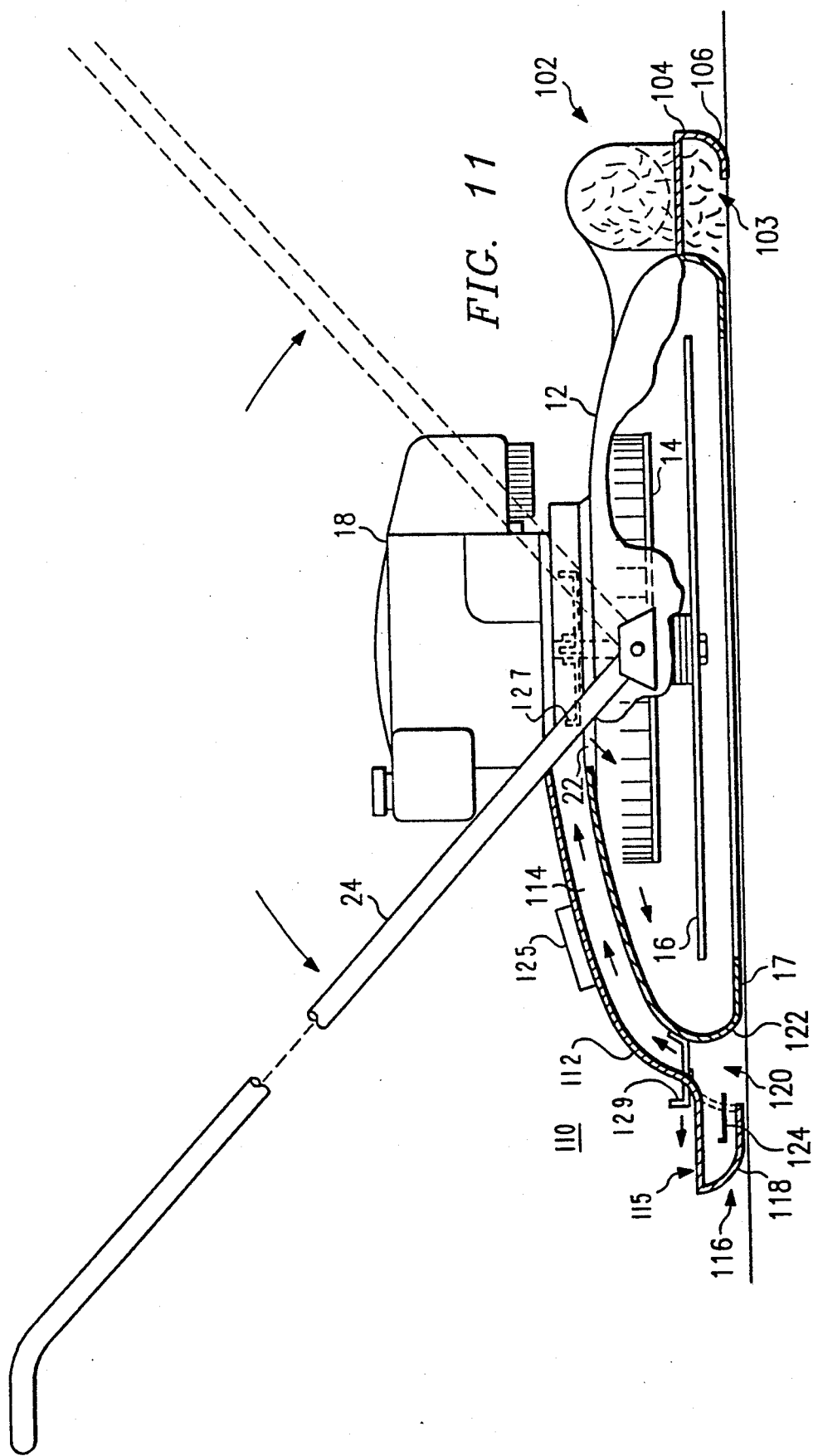

CUTTING APPARATUS MULCH RECYCLE SYSTEM

This invention is a continuation-in-part of prior co-pending application Ser. No. 07/680,788, filed Apr. 3, 1991, now U.S. Pat. No. 5,123,235 which is a continuation-in-part of prior co-pending application Ser. No. 07/528,718, filed May 24, 1990 now U.S. Pat. No. 5,101,615.

FIELD OF THE INVENTION

The present invention relates generally to cutting apparatus, such as lawn mowers and the like, and more particularly to cutting apparatus in which cuttings are recycled for mulching.

BACKGROUND OF THE INVENTION

Mulching of cut grass and other vegetation has significant ecological benefits. Heretofore, it has not been possible to effectively mulch grass clippings and the like with conventional lawn mowers for several reasons, including the problem of clippings falling to the ground beneath the blade after the initial cut. It would therefore be desirable to provide a lawn mower with an improved mulching capability.

DISCLOSURE OF THE INVENTION

In accordance with the present invention, a cutting apparatus is provided having a substantially endless housing with an open bottom, an air intake opening and discharge port; projection means projecting inwardly from a bottom part of the housing; rotatable cutting means mounted in the housing; and recycle means attached to the discharge port for receiving cuttings produced by the rotatable cutting means and delivering the cuttings to a predetermined location adjacent the housing for mulching. The housing cooperates with the projection means to define a substantially enclosed centrifuge chamber. In one embodiment, the recycle means includes applicator means for treating the cuttings to facilitate composting and fermentation thereof following delivery to the ground beneath the apparatus.

In accordance with a unique feature of the invention, the apparatus includes pressurizing means for pressurizing air in the housing. The increased pressure in the housing enhances the centrifugal movement of the cuttings within the housing. The projection means also enhances the air pressure within the housing by directing air inwardly within the housing, to inhibit the escape of air therefrom. In one embodiment, the projection means comprises a relatively flat plate member, which provides a support shelf for the centrifuged cuttings. The plate member cooperates with an inner wall of the housing to channel the cuttings to the discharge port. In another embodiment, the plate member includes diverter means for diverting at least some of the cuttings inwardly toward the cutting means for finer cutting. Increased air pressure within the housing provided by the pressurizing means and the projection means not only enhances the delivery of cuttings to the discharge port, but also enhances the application of the cuttings to the soil through the discharge port under pressure.

In accordance with another feature of the invention, the cutting apparatus includes a plurality of rotatable wheels for supporting the housing. The apparatus is advanced in a forward direction by the rotational movement of the wheels. In another embodiment, a plurality of rotatable roller members are provided for supporting the housing. The roller members preferably include opposed front and rear elongated rollers, with the front roller extending substantially the entire width of a front portion of the apparatus and the rear roller extending substantially the entire width of a rear portion of the apparatus.

In accordance with yet another feature of the invention, the apparatus includes vacuum module means operably coupled to a vacuum side of the pressurizing means for vacuuming cuttings that are not delivered to the support surface by the recycle means. In one embodiment, the vacuum module means includes an agitator brush and means for rotating the agitator brush to stir up the cuttings that are not delivered to the support surface by the recycle means, thereby enhancing the vacuum action. The dedicated centrifuge chamber formed by the housing and projection means facilitates transport of the cuttings to and through the discharge port to the mulch recycle means for application of the cuttings to the soil.

The mulch recycle system according to the present invention is applicable for use in various types of lawn mowers, including wheel-supported lawn mowers and air-floated lawn mowers. The mulch recycle system is preferably located on a front portion of the lawn mower to locate the discharged cuttings in the path of the advancing lawn mower blade for further cutting.

BRIEF DESCRIPTION OF THE DRAWINGS

For a more complete understanding of the present invention and the advantages thereof, reference should be made to the following Detailed Description taken in connection with the accompanying drawings in which.

Figure 12A:
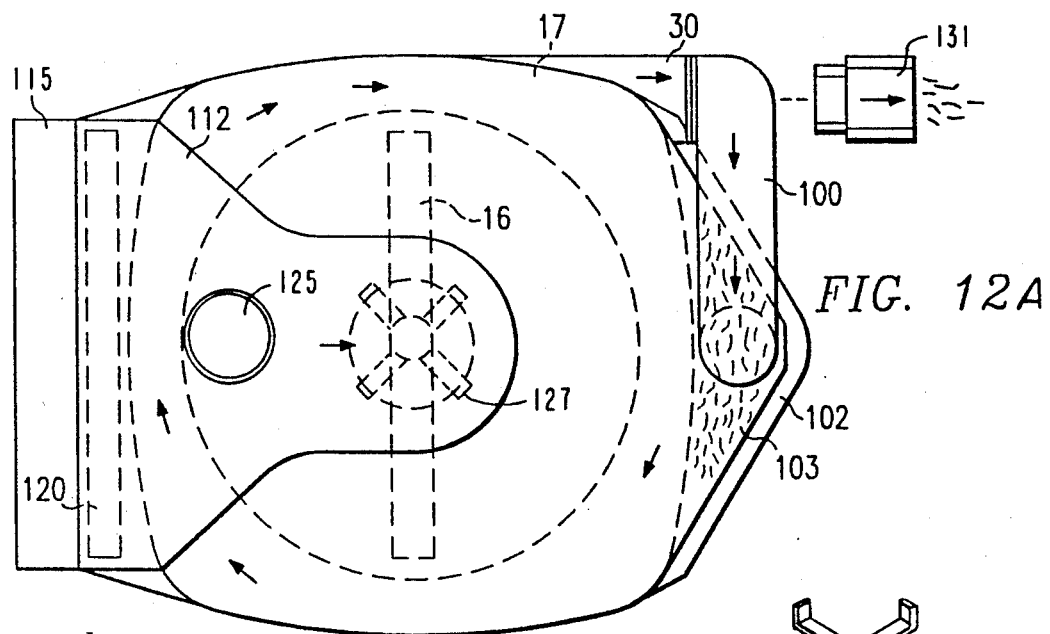
Figure 12B:
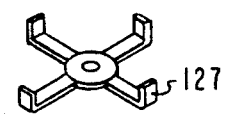
Figure 13:
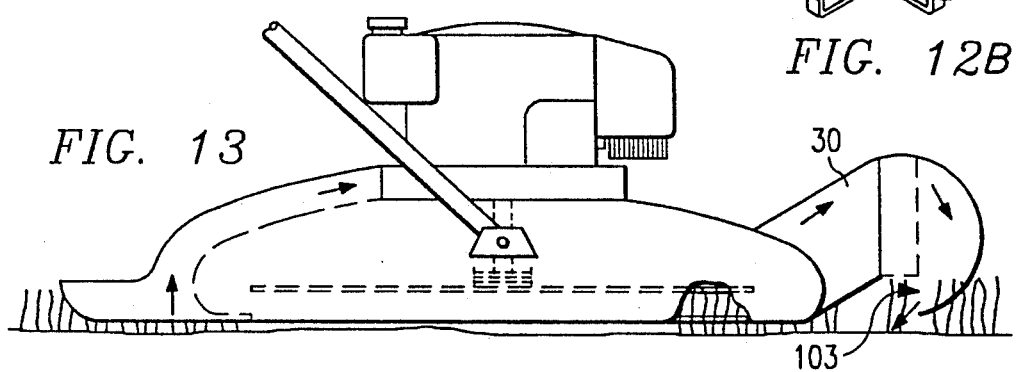
Figure 14:
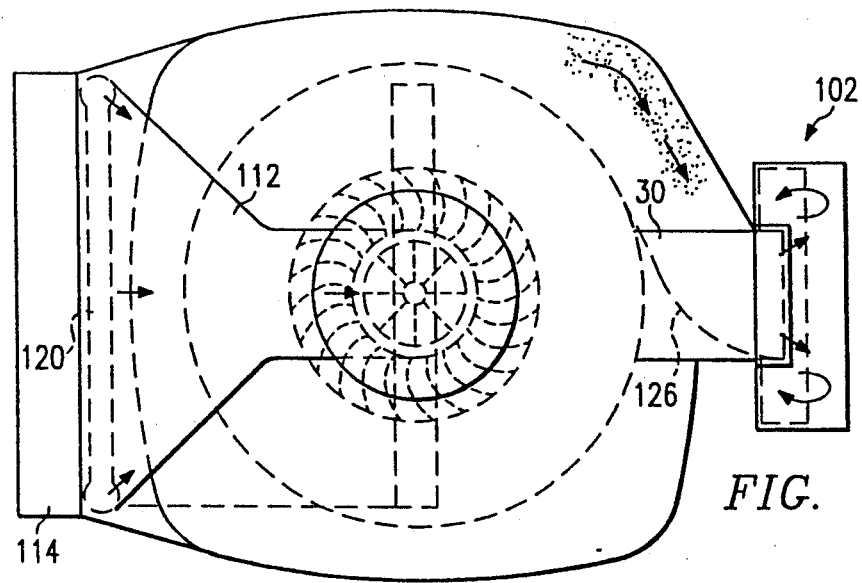
Figure 15:
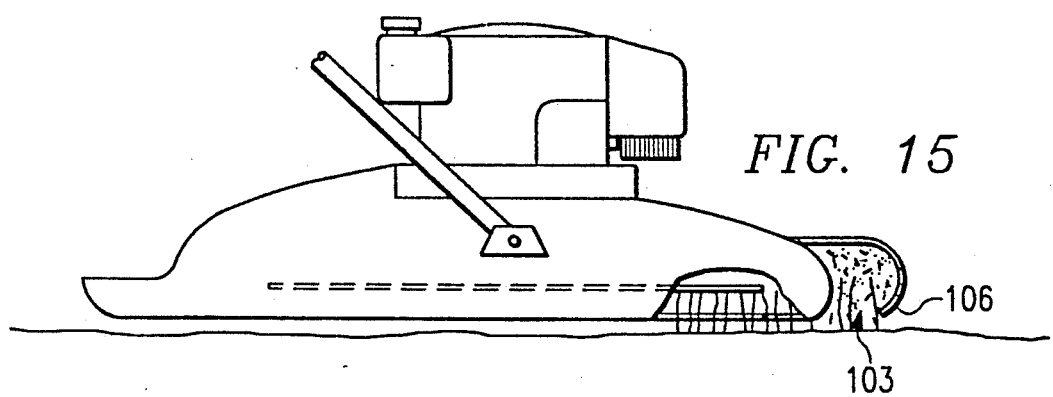
Figure 16:
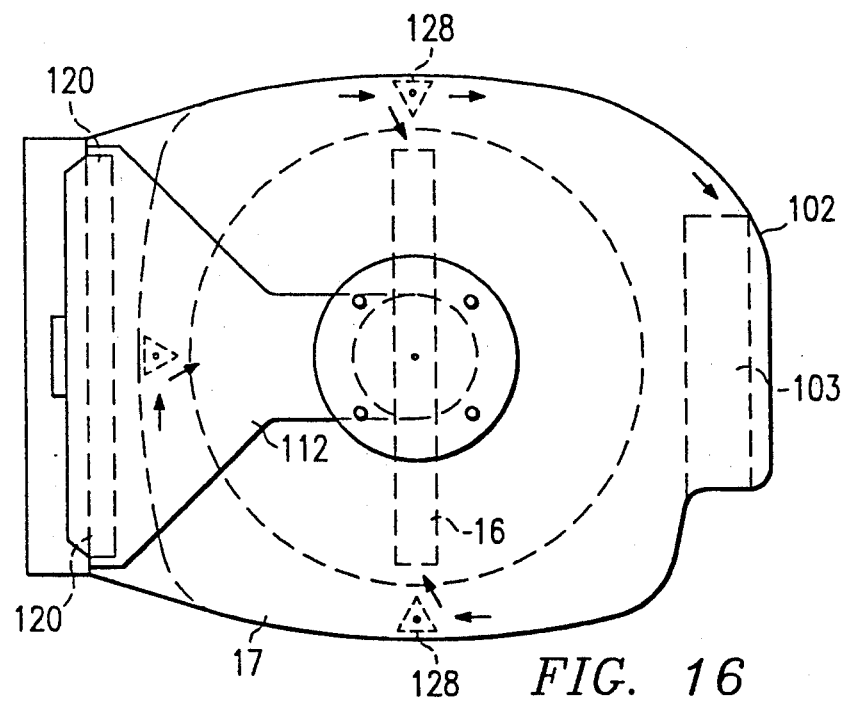

FIG.'s 8A, 9A, 10A and 10D are respective plan views of alternate embodiments of the cutting blade of the invention;

FIG.'s 8B, 9B, 10B and 10C are respective elevational views of the cutting blades of the respective embodiments depicted in FIG.'s 8A, 9A, 10A and 10D;

FIG. 11 is a side view of an alternate embodiment of the invention wherein the air-floated lawn mower includes a frontal mulch recycling chamber and a rear vacuum chamber;

FIG. 12A is a plan view of the air-floated lawn mower of FIG. 11;

FIG. 12B is a perspective view of a vacuum chamber cutting member;

FIG. 13 is a side view of yet another embodiment of the invention including a modified form of the mulch recycling chamber;

FIG. 14 is a plan view of the air-floated mower of FIG. 13;

FIG. 15 is a side view of the preferred embodiment of the invention incorporating a frontal mulch recycling chamber and a rear vacuum chamber;

FIG. 16 is a plan view of the air-floated apparatus of FIG. 15.

Figure 17:
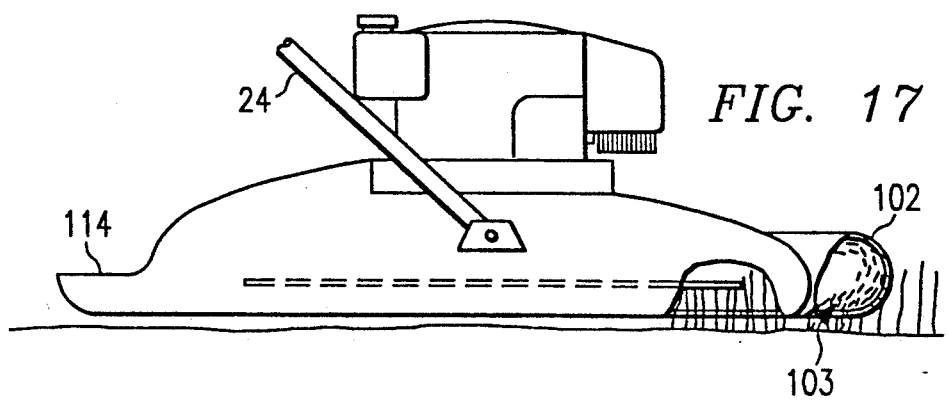
Figure 18:
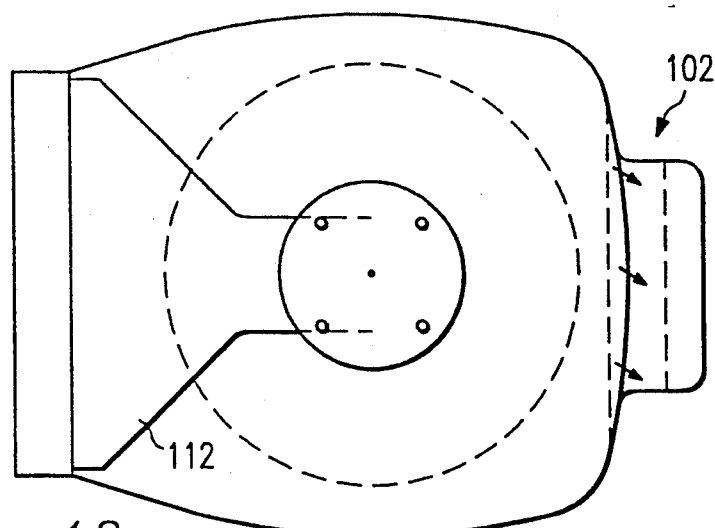
Figure 19:
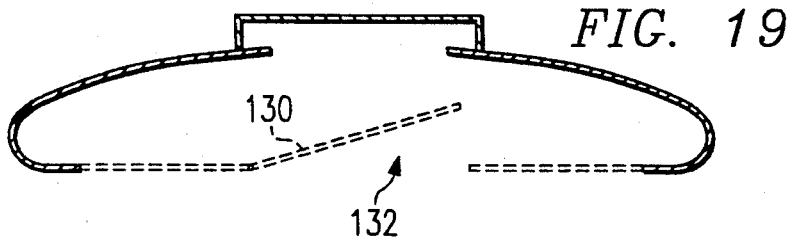
Figure 20:
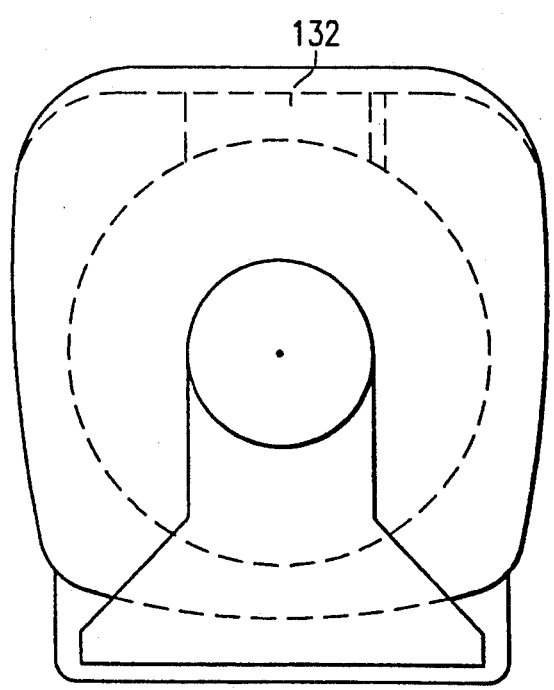
Figure 21:
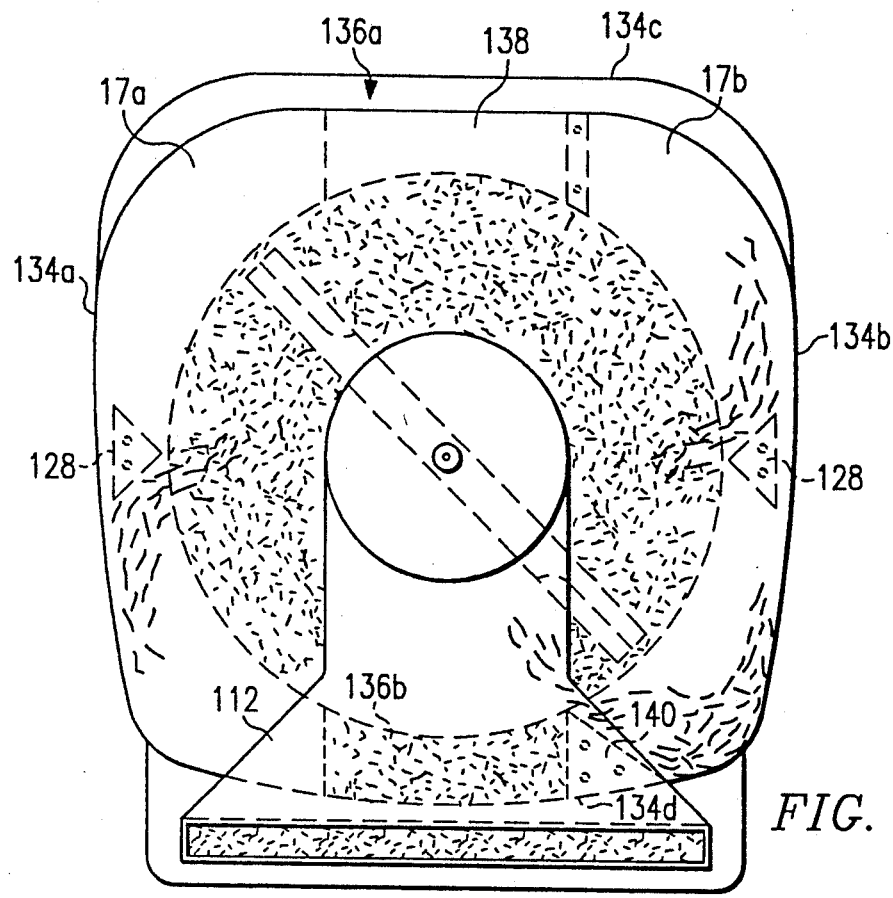
Figure 22:
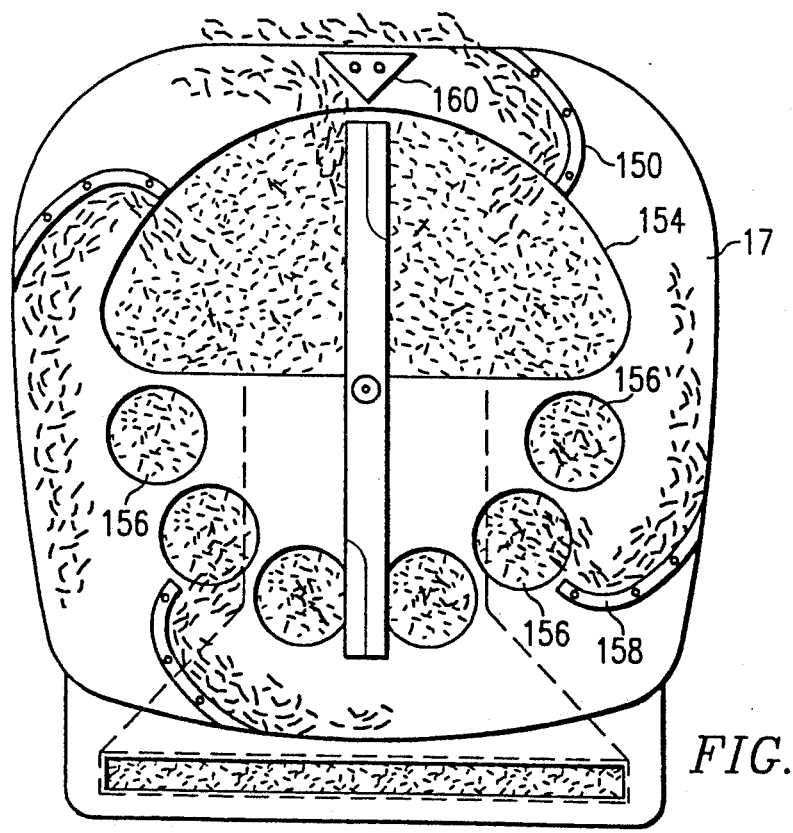
Figure 21A:
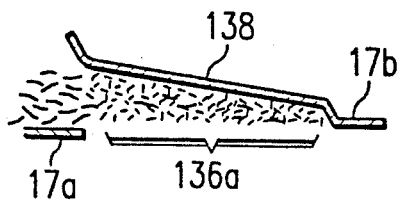
Figure 21B:
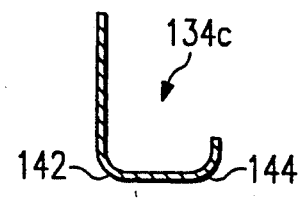
Figure 23A:
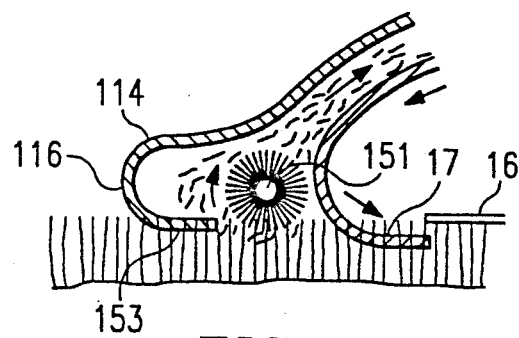
Figure 23:
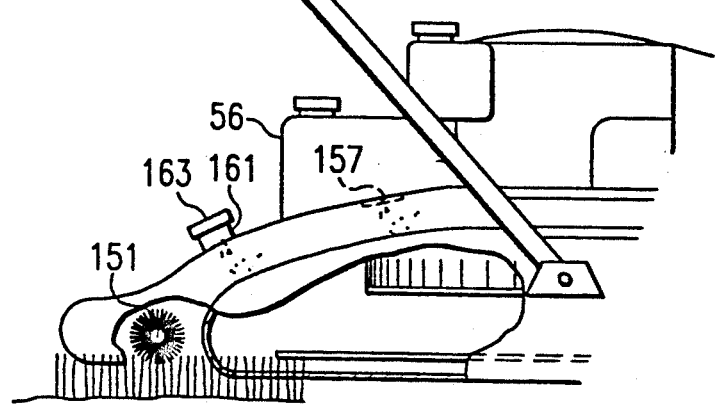
Figure 24:
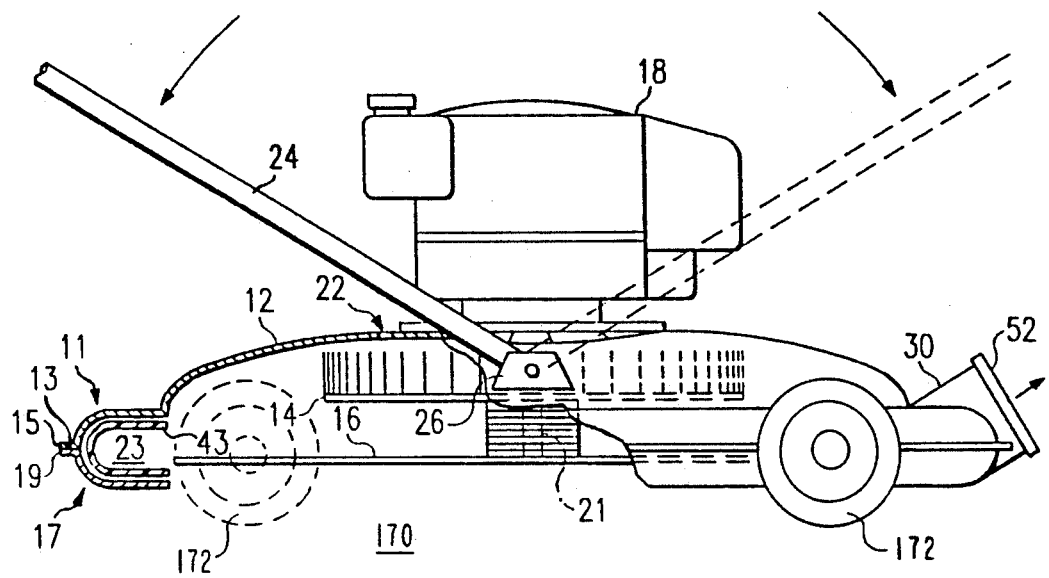
Figure 25:
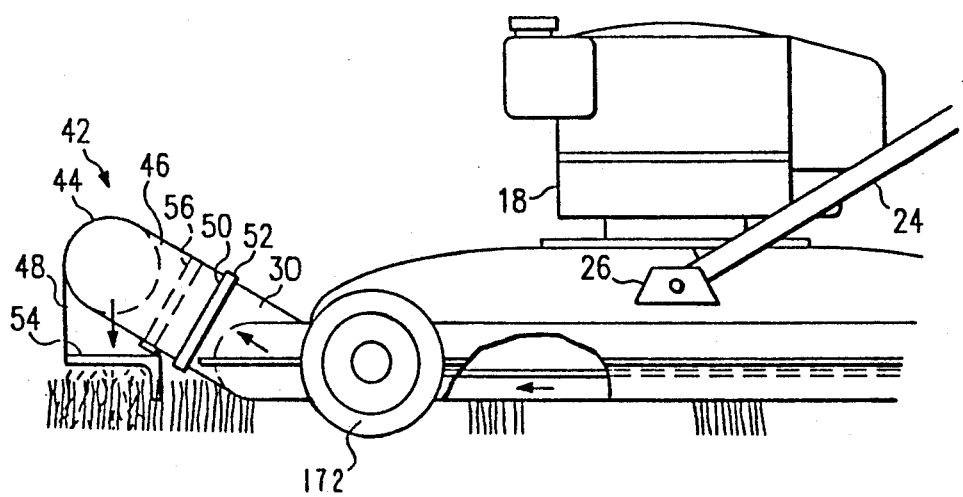
Figure 26:
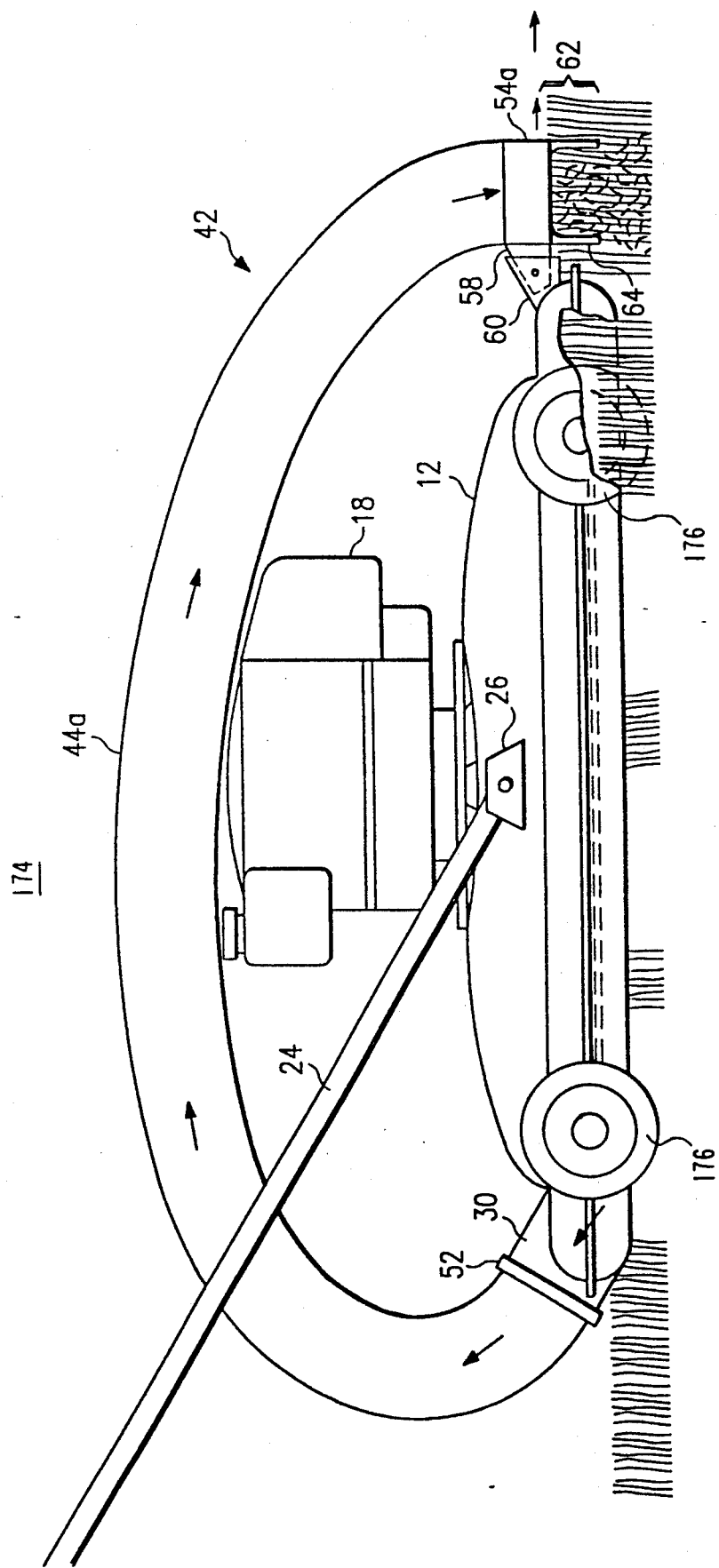
Figure 27:
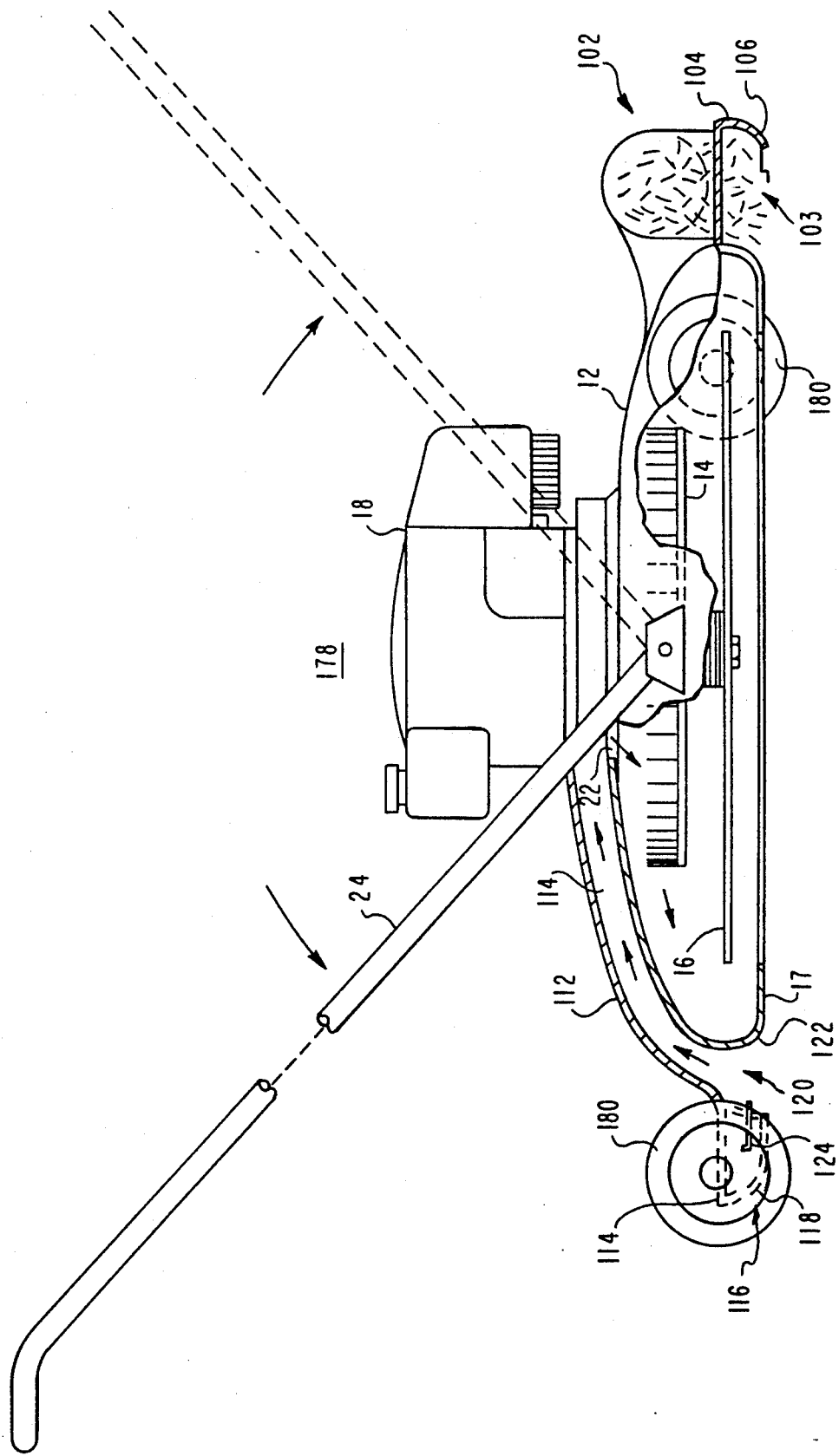
Figure 28:
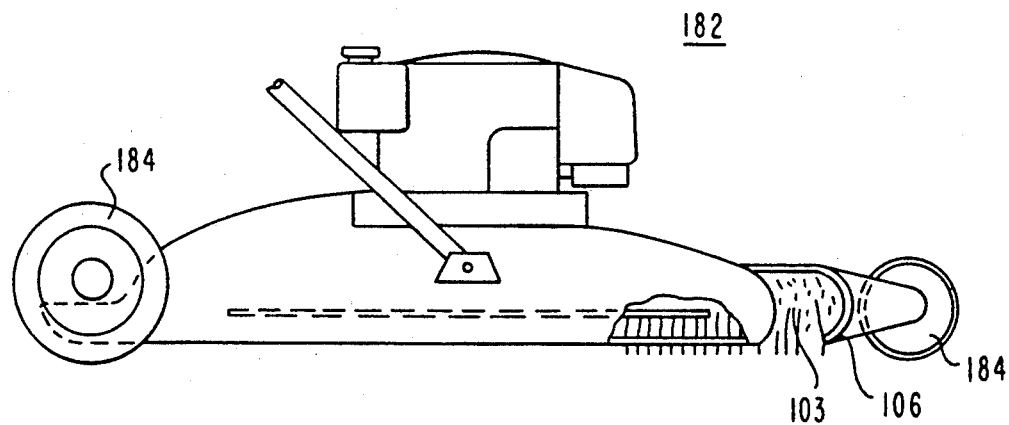
Figure 29:
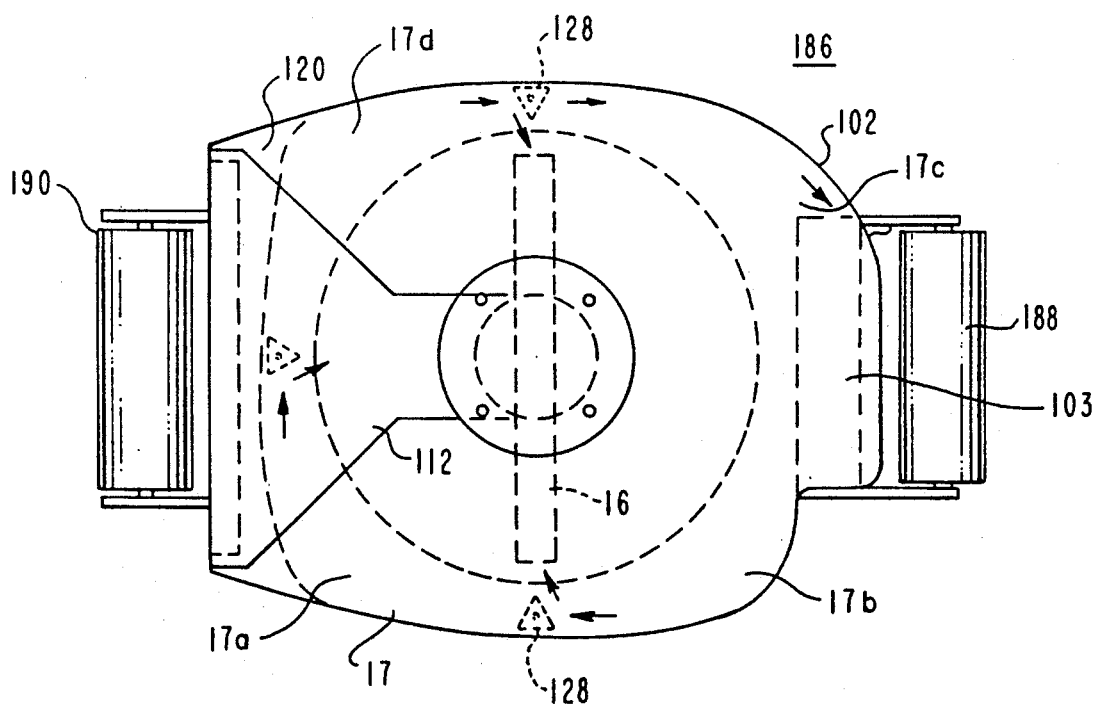

FIG. 17 is a side view of yet another embodiment of the invention including a modified form of the mulch recycling chamber;

FIG. 18 is a plan view of the air-floated mower of FIG. 17;

FIG. 19 is a side view of still another embodiment of the invention incorporating a frontal mulch recycling chamber formed within the frontal portion of the housing itself;

FIG. 20 is a plan view of the air-floated apparatus of FIG. 19;

FIG. 21 is a plan view, partially cutaway, of yet another alternate embodiment of the air-floated apparatus of the invention;

FIG. 21A is a side view of the diverter baffle of the apparatus of FIG. 21;

FIG. 21B is a side view of the frontal portion of the housing of the apparatus of FIG. 21;

FIG. 22 is a plan view, partially cutaway, of yet another alternate embodiment of the air-floated mower construction;

FIG. 23 is a side view, partially cutaway, of a modified form of the lawn mower of FIG. 11, including several additional features according to the invention;

FIG. 23A is a detailed view of a portion of FIG. 23 showing the vertical spacing of the bristle brush supported in the vacuum module;

FIG. 24 is a side view, partially cut away, of a wheel-supported lawn mower without the mulch recycle system attached;

FIG. 25 is a side, partial cutaway view of the wheel-supported lawn mower of FIG. 24 with one embodiment of the mulch recycling system attached to the grass delivery port of the mower;

FIG. 26 is a side view of an alternate embodiment of a wheel-supported lawn mower, wherein the mulch recycling system delivers the grass cuttings to an opposite end of the mower according to the teachings of this invention;

FIG. 27 is a side view of another alternate embodiment of a wheel-supported lawn mower, according to the present invention, wherein the mower includes a frontal mulch recycling chamber and a rear vacuum chamber;

FIG. 28 is a side view of yet alternate embodiment of a wheel-support lawn mower incorporating a frontal mulch recycling chamber and a rear vacuum chamber; and FIG. 29 is a plan view of a variation of the lawn mower of FIG. 28, with the wheels replaced by front and rear support rollers.

Similar reference characters refer to similar parts throughout the several views of the drawings.

DETAILED DESCRIPTION OF THE PREFERRED EMBODIMENTS

Figure 1:
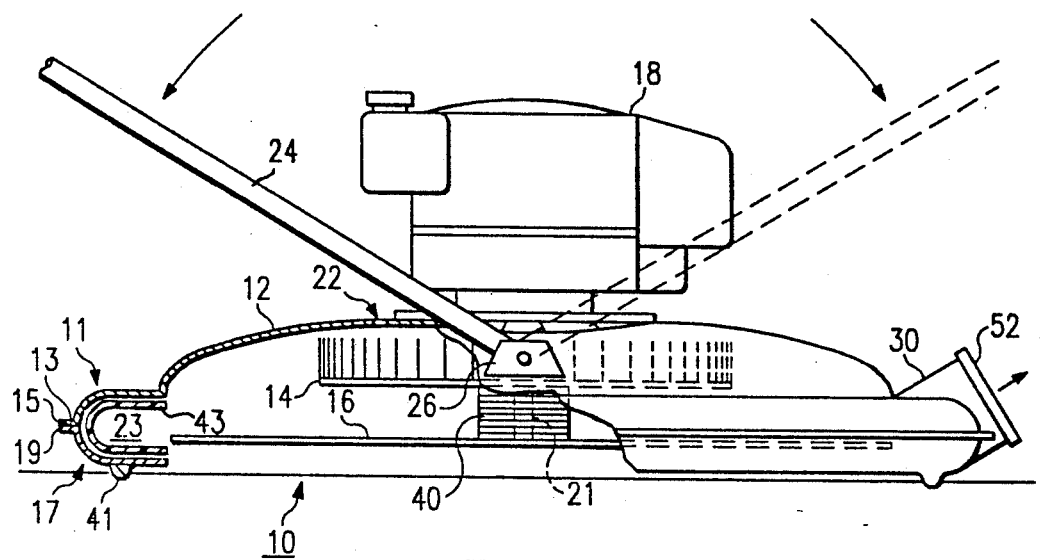
FIG. 1 is a side view, partially cutaway, of a preferred construction of an air-floated lawn mower without the mulch recycle system attached.

Referring now to FIG. 1, an air-floated lawn mower 10 includes an endless housing 12 in which a rotary air impeller 14 and a rotary cutting blade 16 are mounted for common rotation by a power source 18. Power source 18 is operatively mounted on top of housing 12 in a generally central location by conventional fastening means (not shown). Power source 18 can be an AC or DC electric motor, or, alternatively, a conventional lawn mower gasoline engine.

Housing 12 is generally trapezoidal in shape and is preferably made of plastic material formed by an injection molding process to provide a lightweight housing. Housing 12 has a plurality of air intake openings 22 located in a top part thereof and a substantially open bottom. A handle 24 is pivotally attached, as indicated at 26, to respective opposite sides of housing 12 to allow a user to control movement of the mower as will be described below. Grass cuttings are discharged from housing 12 through a rearwardly-extending discharge port or duct 30.

Air impeller 14 is preferably comprised of lightweight plastic material, and may be formed by injection molding. Cutting blade 16 is positioned below impeller 14 within housing 12, and the spacing between impeller 14 and blade 16 is adjustable by means of shims or spacers 40. The vertical position of cutting blade 16 within housing 12 determines the height of the resulting grass cut.

The housing 12 has a flared extension 11 having a lower edge 13. Edge 13 has an outwardly-extending flange 15. A plate member 17, having a profile that is essentially a mirror-image of the housing, also includes an outwardly-extending flange 19 adapted to mate with the flange 15 of the housing lower edge. The flanges 15 and 19 are secured by means of welding or suitable fasteners to form a centrifuge chamber 23 in which glass clippings cut by the cutting blade 16 are centrifuged. Once the plate member is attached, the mower 10 has a substantially endless housing having an open bottom, the air intake openings and the discharge port 30. In operation, the blade 16 and the impeller 14 are adapted for co-rotation about shaft 21. Impeller 14 is configured to draw air into housing 12 through air intake openings 22 and expel the air outwardly from impeller 14 along inner surface 38 of housing 12. The air flow within housing 12 is depicted by arrows 13.

As also seen in FIG. 1, the plate member 17 includes an air entrapment boss 41 integrally formed on or otherwise secured to an outer surface thereof for further sealing against air loss, thus promoting enhanced flotation. In particular, the air entrapment boss 41 provides a secondary lifting action by preventing pressurized air from escaping from underneath the housing. Additionally, in the preferred embodiment a molded anti-stick raceway 43 is adapted to be snapped into the centrifuge chamber 23 for increasing the acceleration of the clippings being centrifuged. The raceway is preferably coated or otherwise treated with an anti-stick coating and provides a positive directional channeling force to facilitate the movement of the clippings directly to the discharge port 30 and thus out of the housing 12. The raceway includes flanges 45 adapted to snap onto the bottom lip of the plate member and the intersection of the flared extension 11 and the major portion of the housing.

Figure 2:
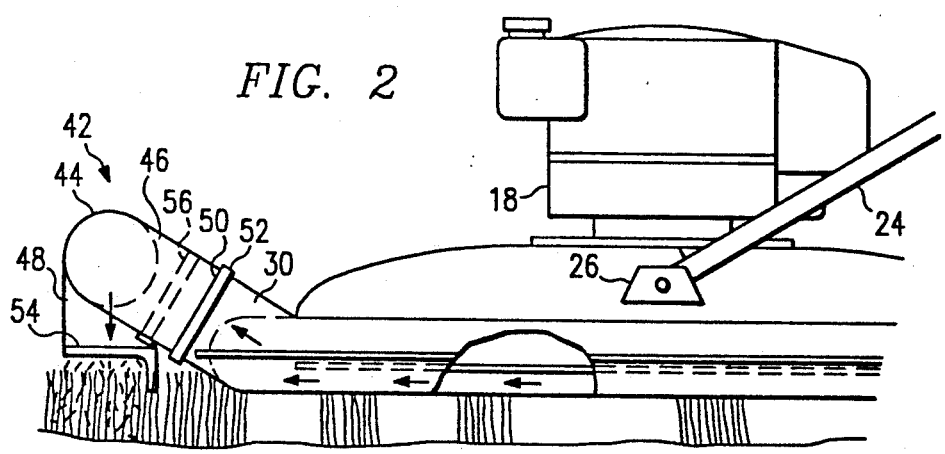
FIG. 2 is a side partial view of the air-floated lawn mower of FIG. 1 with one embodiment of the mulch recycling system attached to the grass delivery port of the mower.

Referring now to FIG.'s 2 and 4, the centrifuge chamber advantageously transports grass clippings to and through the discharge port 30 to a mulch recycle system designated generally by the reference numeral 42. In this embodiment, the mulch recycle system 42 includes a preferably one-piece mulch conduit 44 having a first angle member 46 and a second downwardly-extending member 48. The conduit is preferably formed of suitable plastic material or the like. The first member 46 has an end 50 adapted to mate with a flange 52 of the discharge port. The second member is integral with the first member 46 and terminates at a port 54 located directly in front of the housing. As best seen in FIG. 2, the port 54 recycles the grass clippings, which have been cut and centrifuged out of the discharge port 30, back in front of the moving housing. This operation enables the cuttings to be recut continuously to create ultra-fine cuttings useful in mulching. Of course, if the system 42 is removed, a grass catcher (not shown) can be affixed to the discharge port 30 and the handle pivoted to enable the mower to be used in the conventional manner.

As also seen in FIG. 2, preferably the system 42 includes an applicator 56 within the conduit 44 for treating the grass clippings with enzymes and/or bacteria to facilitate composting and fermentation. The applicator can be located at any position along the conduit, or at the entrance or exit thereof, for providing the bacterial or enzyme treatment. The applicator preferably provides a liquid application to the stream of clippings to enhance such composting and fermentation. The present invention, however, is construed to cover any type of bacteria/enzyme application at the entry to, the exit of, or within the mulch delivery conduit.

Figure 3:
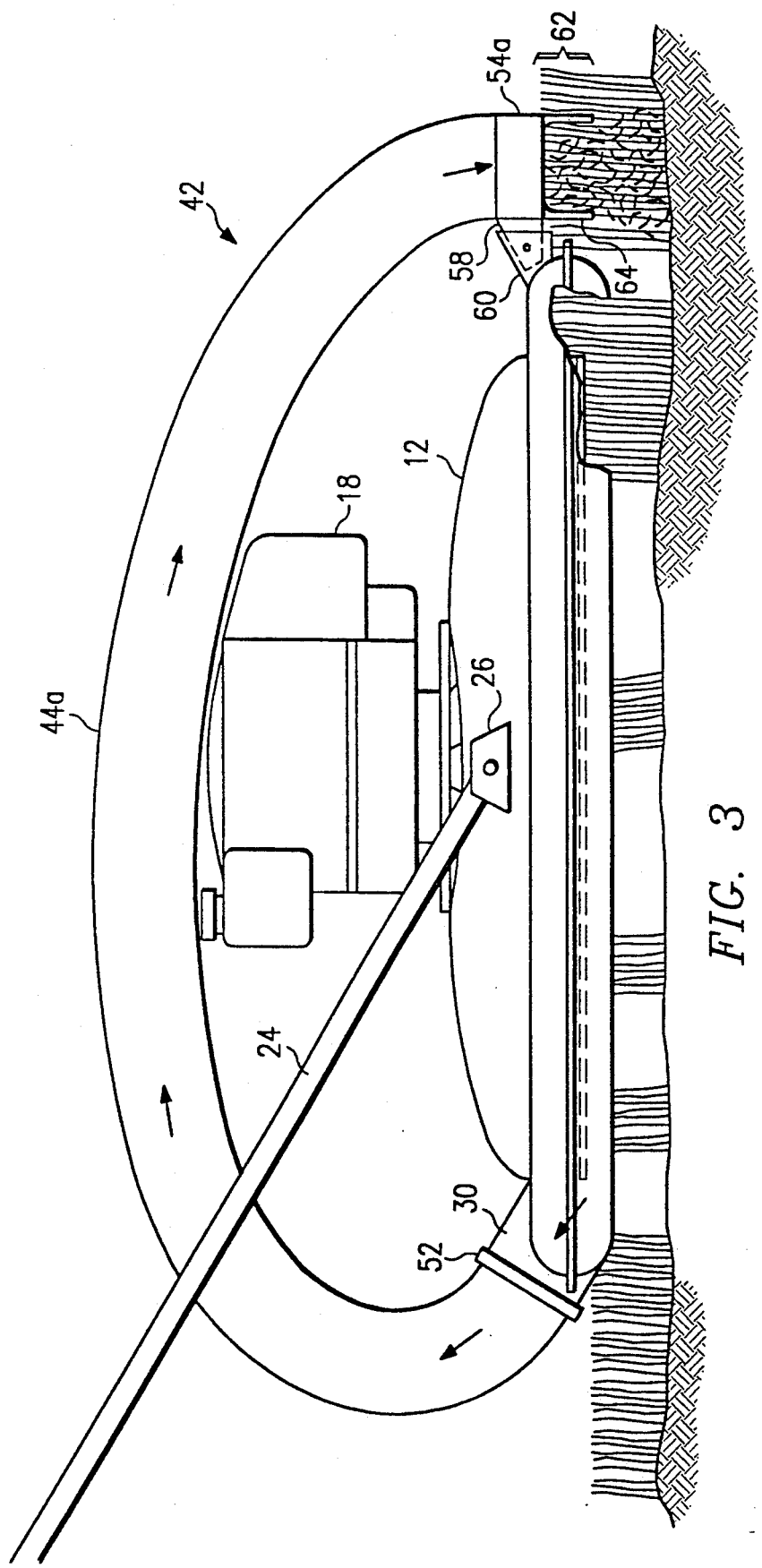
FIG. 3 is a side view of an alternate embodiment of the invention wherein the mulch recycling system delivers the grass cuttings to an opposite end of the mower according to the teachings of this invention.
Figure 4:
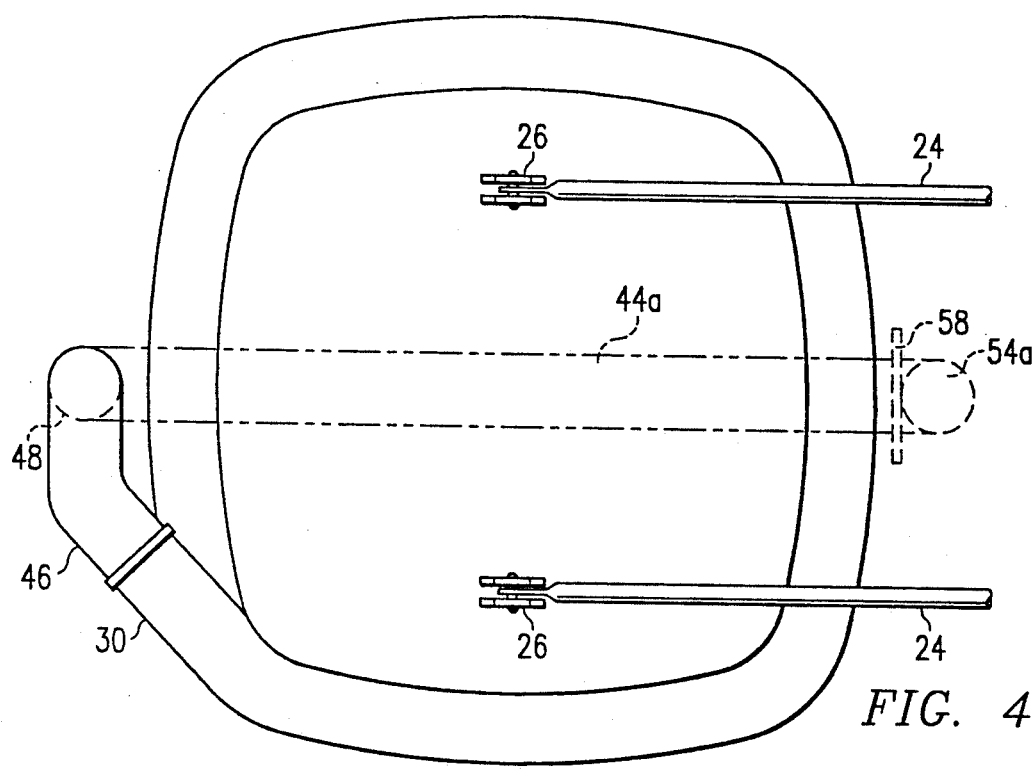
FIG. 4 is a plan view of the main housing of the lawn mower of FIG. 1 showing the alternative attachments of the mulch recycling system illustrated in FIG.'s 2 and 3.

In accordance with a further feature of the invention as seen in FIG. 3 and as shown in phantom in FIG. 4, the mulch recycling system 42 includes means for delivering the grass clippings from the discharge port 30 of the housing to an opposite end of the housing. In this embodiment, the handle 24 of the lawn mower 10 is pivoted over the discharge port 40 as shown. The system 42 includes a conduit 44a having a substantially semi-circular shape adapted to overlay the housing and direct the grass clippings to the opposite end of the housing. The conduit 44a also has a discharge port 54a located at its end which is secured against movement by bracket 58 attached to a support member 60 located on the housing 12. Bracket 58 also supports at its lower end a rake module 62 comprising a plurality of spring-like tines 64. The tines advantageously drive through the uncut grass as the mower is advanced for the purpose of vibrating or disturbing the uncut grass. This operation enhances the dispersion of grass clippings from the recycle system 42. Of course, the rake module 62 can also be provided in the mulch recycle system of FIG. 2.

Figure 5:
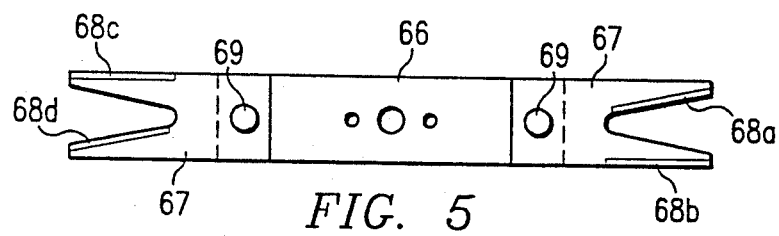
FIG. 5 is a side view of one type of cutting blade used in the air-floated lawn mower of FIG. 1.

Referring now to FIG. 5, one embodiment of the cutting blade 16 is shown. The blade 16 includes a base 66 having two swivel blades 67 removably secured thereto by fasteners 69. Each blade is adapted to swivel about a fastener 59; alternatively, the blades 67 can be fixed to the base to form an integral blade. A plurality of cutting tips 68 are arranged on the blades 67. A first pair comprises tips 68a and 68b, while a second pair comprises tips 68c and 68d. Preferably, tip 68a is crimped and thus extends from the base at a different horizontal position as compared to the tip 68b; likewise, tip 68c is crimped and thus extends at a different position as compared to tip 68d. Preferably, each cutting tip 68 is located at a different "stepped" position, with each tip cutting at a different depth or cutting level of approximately $\frac{1}{4}$-$\frac{3}{8}$ inch. This construction provides a stepped cutting arrangement as the cutting blade is rotated. Such stepped cutting provides extremely-fine grass clippings to facilitate the mulching operation.

Figure 6:
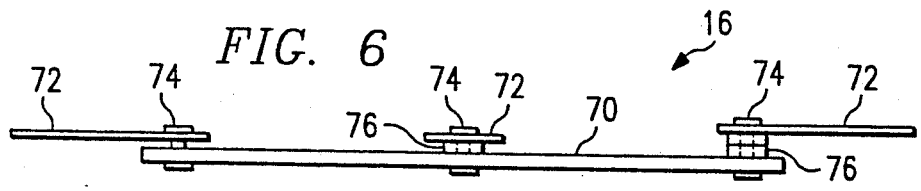
FIG. 6 is a plan view of an alternate embodiment of the cutting blade having a plurality of swivel cutting blades located at predetermined stepped positions.
Figure 7:
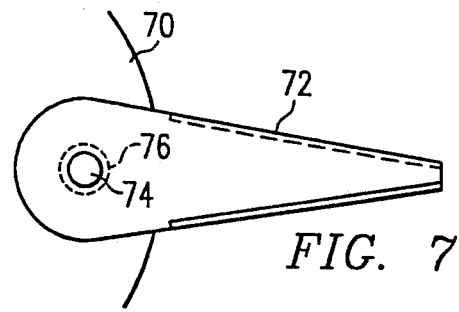
FIG. 7 is a plan view of one of the swivel cutting blades of FIG. 6.

A first alternate embodiment of the cutting blade is shown in detail in FIG.'s 6-7. In this embodiment, the cutting blade 16 comprises substantially-circular base 70 having a plurality of swivel blades 72 attached to the periphery thereof by suitable fasteners 74. In particular, each blade 72 is mounted for swivel movement about the fastener 74 as the base 70 is rotated. As best seen in FIG. 6, preferably one or more of the blades 72 is mounted at a different vertical position from the other blades. The stepped mounting of the blades can be accomplished using shims or spacers 76. Each of the blades is formed of metal, plastic, or some other flexible material.

A second alternate embodiment of the cutting blade is shown in detail in FIG.'s 8A and 8B. In this embodiment, the cutting blade 16 comprises a substantially circular base 80 having a plurality of flexible blades 82 drawn through access ports 84 as best seen in FIG. 8B. Each of the blades preferably comprises a length of aircraft cable or the like 86. One end of the cable 86 is crimped with a steel ball terminal 88 adapted to be maintained in the access port 84. The opposite end of the cable 86 is crimped by a steep cutting edge 90 that prevents the cable from fraying and acts as the primary cutting edge. Steel cutting edge 90 increases the useful life of the edge. Although not shown in detail, each access port 84 can be placed at a different position to generate a stepped cutting profile as the blade 16 rotates.

A peripheral ring 91 is preferably molded with base 80 so as to completely circumscribe base 80. Ring 91 is connected to base 80 by three spokes 92, thereby defining three spaces 93 in the shape of a partial annulus between base 80 and ring 91.

Figure 8A:
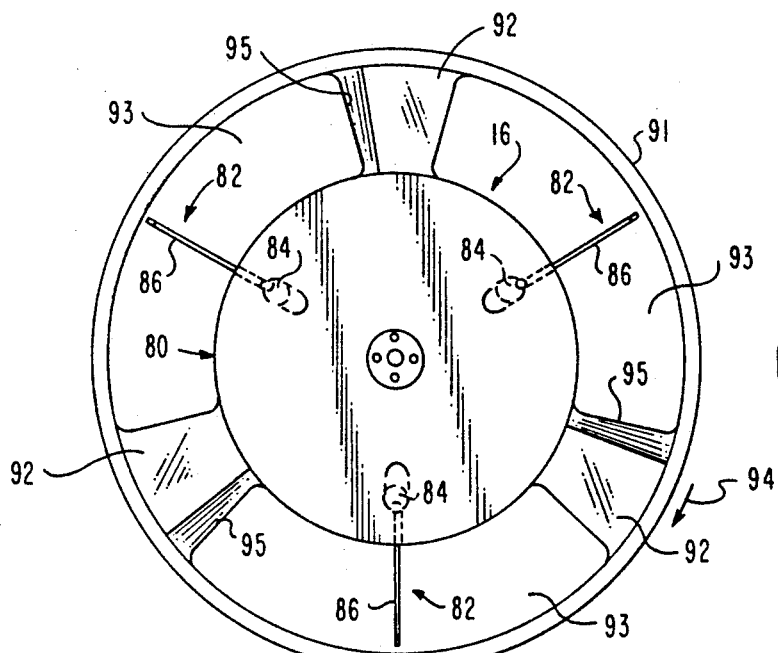
Figure 8B:
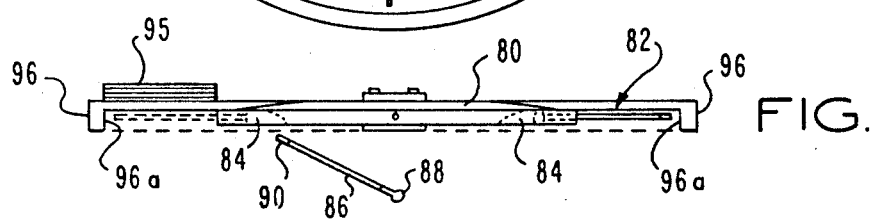

The direction of rotation of cutting blade 16 and ring 91 is in the directions indicated by arrow 94 (i.e., clockwise as shown in FIG. 8A). To enhance the lifting action on the vegetation being cut, an inclined member 95 is carried on the trailing end of each spoke 92. As spokes 92 are rotated, air flowing upwardly along the respective surfaces on inclined members 95 creates a lifting force on the vegetation being cut.

As can be best seen in FIG. 8B, ring 91 includes a vertical wall 96, which extends below flexible blades 82, to shade blades 82 from rocks and debris. Furthermore, ring 91 substantially reduces the outward slinging and throwing action typically associated with a lawn mower blade. Ring 91 also inhibits access to flexible blades 82 by an object inserted into the cutting chamber beneath the mower housing. Rocks and other debris are trapped in spaces 93 and directed down to the ground by inner surface 96a of vertical wall 96.

Figure 9A:
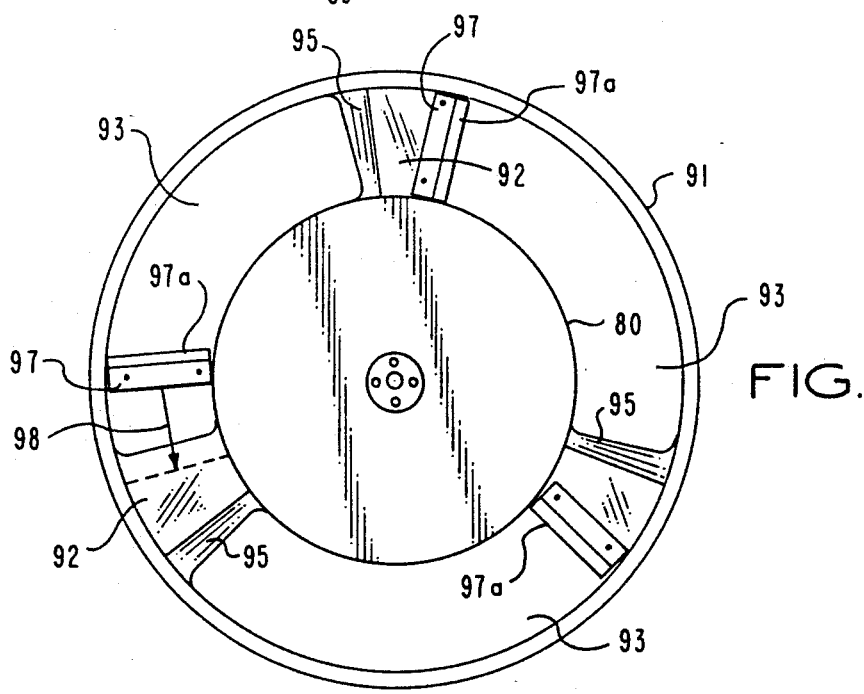
Figure 9B:
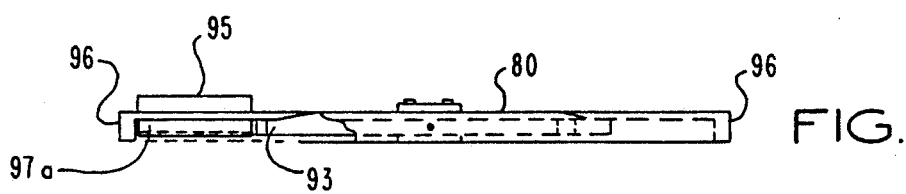

A third alternate embodiment of the cutting blade is shown in detail in FIG.'s 9A and 9B. In this embodiment, the flexible blades 82, depicted in FIG.'s 8A and 8B above, are replaced by three snap-on steel cutting blades 97 attached to the respective leading ends of spokes 92. Arrow 98 depicts the attachment of each cutting element 97 to the corresponding spoke 92. As can be best seen in FIG. 9B, the cutting tip 97a of each blade 97 extends downwardly into space 93 between the perimeter of base 80 and vertical wall 96. Otherwise, the embodiment shown in FIG.'s 9A and 9B is substantially the same as the embodiment shown in FIG.'s 8A and 8B.

A fourth alternate embodiment of the cutting blade is shown in detail in FIG.'s 10A and 10B. In this embodiment, a plurality of swivel blades 98 are attached to ring 91 by suitable fasteners 99. In particular, each blade 98 is mounted for swivel movement about the corresponding fastener 99 as ring 91 is rotated in the direction indicated by arrow 100. As can be best seen in FIG. 10B, each swivel blade 98 may be mounted at a different vertical position along the depth of vertical wall 96 from the other blades 98. For example, swivel blades 98A and 98B are mounted at the top of vertical wall 96 and blade 98C is mounted at the bottom of vertical wall 96. Blade 98D is mounted within a slot 101 formed in vertical wall 96 intermediate the top and bottom thereof. The different vertical mounting positions of blades 98 provide a vertical stepped cutting configuration to enhance the mulching operation.

A fifth alternate embodiment of the cutting blade is shown in detail in FIG's 10C and 10D. In this embodiment, the cutting elements are a plurality of flexible blades 105 arranged circumferentially round ring 91 and extending radially outward therefrom. As can be best seen in FIG. 10C, each blade 105 is mounted in an opening extending radially through vertical wall 96. The location of each blade 105 can be varied along the vertical depth of vertical wall 96 to provide a stepped cutting configuration, as previously described. Vertical wall 96 of ring 91 defines an entrapment chamber in the space 93 between vertical wall 96 and the perimeter of base 80, to trap rocks and other debris and reduce the slinging or throwing effect of the cutting blade.

Therefore, according to the preferred embodiment of the invention, the air-floated lawn mower includes an improved cutting blade mechanism wherein either a stepped arrangement of cutting teeth or a plurality of flexible cable-like blades are provided to enhance the cutting action. The resulting grass clippings are then centrifuged out of the housing through a dedicated centrifuge chamber to a discharge port. A mulch recycle system delivers the grass clippings to a predetermined location adjacent the housing as the mower is advanced. This operation provides effective mulching of the grass clippings in a manner that is neither disclosed nor suggested by the prior art.

The novel mulching system described above is advantageous in that the grass clippings are centrifuged from a given delivery port preferably to the frontal area of the cutting apparatus whereby the delivery of the clippings occurs with air pressure in the mowing direction path into the open atmosphere. The delivery port is approximately level with the uncut grass, allowing the clippings to be directed down and through the uncut grass in the open atmosphere. The forward motion allows for a recycling recut of the clippings as well as the disturbance of the grass being cut, whereby the recycled clippings are driven in and through the grass being cut creating a very fine cut of grass clippings to facilitate the composting thereof, thus promoting rapid decay.

In an alternate embodiment of the invention, an air-floated lawn mower apparatus includes a frontal mulch recycling system and a rear vacuum chamber module as shown in FIG.'s 11-20. Referring to FIG.'s 11-12, which are side and plan views respectively of one embodiment, the mower includes the housing 12 having an integral plate member 17 to form a substantially endless housing having an open bottom. As best seen in FIG. 12, the discharge port 30 of the housing 12 is not connected directly to the outside atmosphere as described above, rather, the port receives a conduit 100 which, in turn, directs the cut grass clippings into a frontal mulch recycling module 102 having a chamber 103. As seen in FIG. 11, the mulch recycling module 102 includes a rounded leading edge 104 which presents a curved profile 106 to the grass surface, thereby promoting the gliding action of the mower and serving to effectively seal pressurized air within the recycling chamber 103. By effectively sealing the mulch recycling chamber 103 from the outside atmosphere, and by connecting this chamber to the pressurized air used to float the apparatus and to centrifuge the cut clippings, sufficient air pressure is provided for directing clippings back to cutting blade 16 for mulch cutting and to the frontal chamber 103 for recycling.

Such improved results are even more significant when the frontal mulch recycling module 102 is combined with a preferably rear-supported vacuum chamber means 110 as seen in FIG.'s 11-12. Although vacuum chamber means 110 is not required, it is preferred. Vacuum chamber means 110 is formed through the addition of a triangular-shaped shroud 112 which, together with the rear portion of the housing 12, forms a chamber 114 connected with air intake openings 22 to the vacuum side of the impeller 14. The vacuum chamber means 110 includes a rear deck 115 having a rounded trailing edge 116 which presents a curved profile 118 to the grass surface. The trailing edge 116 terminates along a vacuum slot 120 between the edge and a rounded portion 122 of the housing 12. The rear deck 115 supports an adjustable sliding blade 125 which is movable to change the width of the vacuum slot 120 when it is desired to adjust the vacuum pressure.

Shroud 112 has a port 125 communicating between chamber 114 and the outside atmosphere. Port 125 is adapted to receive a flexible hose (not shown) or the like in a snap-twist lock connection. A dicing blade 127 is located in vacuum chamber 114 above impeller 14.

Leaves and other debris can be introduced into vacuum chamber 114 for mulching as follows. A flexible hose, which is preferably three inches in diameter, is attached to port 125. A slidable gate 129 is moved into the position shown in FIG. 11 to close off the bottom portion of vacuum chamber 114. The lawn mower apparatus is operated, such that impeller 14 sucks leaves and other debris through the flexible hose connected to port 125 into vacuum chamber 114. The material sucked into vacuum chamber 114 is initially cut by dicing blade 127 and is directed downwardly into the cutting chamber by the suction action of impeller 14. The material is recut by cutting blade 16 and directed to the recycling module 102 for mulch recycling. Alternatively, the material may be directed through a delivery port 131 to a grass catcher (not shown) or other receptacle. The aforementioned configuration is particularly useful for vacuuming up leaves and other debris from flower gardens, vegetable gardens and other areas where it may be inconvenient or impractical to operate a lawn mower.

The lawn mower apparatus of FIG.'s 11-12 had significant advantages. In operation, the frontal mulch recycling chamber diverts grass clippings produced by the rotatable cutting blade 16 at high pressure back into the grass surface under the recycling chamber. The mulch recycling chamber is not directly vented to the air outside the apparatus, but rather to the interior of the housing 12. This construction advantageously uses the air pressure used to float the housing 12 to drive the fine-mulched clippings into the ground after centrifuging. Most of the cut grass clippings (which should be a small percentage) can then be cleaned up using the vacuum module for subsequent recycle and recut. In particular, vacuum chamber means 110 advantageously "vacuums" the previously cut remaining grass clippings deposited under the housing by the mulch recycling chamber but not otherwise dispersed into the soil and also loose material such as leaves for cutting and mulching. The vacuum chamber is preferably driven by a vacuum created by the impeller 14 used to float the mower, although a separate small impeller could also be used. In combination, the use of mulch recycling chamber and the vacuum chamber provides significantly-enhanced mulching effects as the mower is advanced in a forward direction.

It should be appreciated that the frontal mulch recycling chamber thus encapsulates and maintains significant air pressure to substantially prevent air leakage from the housing 12. This chamber is preferably attached or molded to the housing, thus promoting a maximum lift. By minimizing escape of air from the housing, the frontal mulch recycling chamber maximizes the air pressures used to disperse the grass clippings in the uncut grass through and into the soil area to promote composting and decay. Any grass clippings that have not been dispersed in the soil area are thus vacuumed by the vacuum chamber, recycled and recut by blade 16 after being drawn through the air intake openings 22. The vacuum source thus promotes minute clean-up of any clippings that are trailed from the frontal mulching system.

Numerous alternative structures for the frontal mulch recycling chamber are envisioned by the present invention without departing from the spirit thereof. FIG.'s 13-14 show side and plan views, respectively, of one such embodiment wherein the frontal mulch recycling module 102 is attached to a center delivery discharge port 30. The module 102 can, of course, be removed to facilitate the attachment of a grass catching bag if the handle 24 is pivoted over the housing as described above. As best seen in the plan view of FIG. 14, a diverting baffle 126 is located within the housing 12 to guide the grass clippings through the centerline-located discharge port 30, into the mulching module 102 and down into the grass surface.

FIG.'s 15-16 show side and plan views, respectively, of a preferred embodiment of the invention wherein the frontal mulch recycling module 102 is integrally-formed as an extension of the housing 12. As seen in FIG. 16, in this embodiment the plate member 17 also supports (through suitable attachment means) one or more substantially triangular-shaped diverter barriers 128 selectively positioned at predetermined positions along the outer diameter of the plate member 17 for diverting grass clippings back into the path of the blade member 16. Following such recutting and centrifuging, these clippings are extremely fine. They are then diverted to the mulch recycling module 102 having the chamber 103 as described above. Mulch recycling module 102 has a rounded outer facing profile to facilitate movement of the mower through the grass. The chamber 103 disperses the ultra-fine clippings into the soil area at great pressure, thus contributing to the penetration of these clippings in and through the uncut grass and into the ground for eventual decomposition and decay.

FIG.'s 17-18 show side and plan views, respectively, of yet another preferred embodiment of the invention wherein the mulch recycling module 102 is again centrally-located along the frontal portion of the housing 12. This structure differs from that of FIG.'s 13-14 because the discharge port 30 is omitted and the module 102 is formed as an extension of the housing substantially as shown.

FIG.'s 19-20 show side and plan views, respectively, of another embodiment wherein the frontal mulch recycling chamber is merely positioned within the existing house 12 (i.e., with no extension thereof). The module 102 then comprises the diverting baffle 130 which serves to forcefully divert the cut grass clippings through a slot 132 in the plate member 17. This construction is simple and inexpensive to manufacture but still preserves the basic operating principles of the invention.

Although not discussed in detail, it should be appreciated that the various air-floated apparatus of FIG.'s 13-20 may include the vacuum chamber module described above.

Yet another embodiment of the invention is shown in plan view in FIG. 21. As in the embodiment of FIG. 11, a vacuum chamber means is formed through the use of a triangular-shaped shroud 112. This apparatus differs from the previous embodiments in that the plate member 17 now includes first and second symmetrical members 17a and 17b which are located along the side portions 134a and 134b of the housing, respectively. Each of the members 17a and 17b is semi-circular in shape and supports one of triangular-shaped barriers 128 as previously described. The members 17a and 17b are separated by the space 136a, located adjacent the frontal portion 134c of the housing, and by the space 136b, located adjacent the rear portion 134d of the housing but in front of the vacuuming slot. As best seen in FIG. 21A, the frontal space 136a is actually a discharge port for the apparatus. In particular, and like FIG. 19, a diverter baffle 138 is attached to the plate member 17b and presents an upwardly-directed profile into the centrifuge chamber. The cut grass clippings, which have been recut by virtue of being diverted back into the path of the cutting blade by the diverter barriers 128, are eventually transported around the centrifuge chamber and forced against the diverter baffle 138, whereupon they are forcefully discharged into the ground through the space 136a. Thereafter, as the apparatus is advanced in a forward direction, the vacuum module can be used to vacuum any remaining clippings as previously disclosed. Alternatively, the clippings can be left on the ground for composting or collected in a bag.

As also seen in FIG. 21, the plate member 17b supports a barrier 140 adjacent the space 136b to recycle the cuttings back into the path of the cutting blade. Of course, the space 136b alternatively can be filled by connecting the rear portions of the plate member 17a and 17b, in which case the barrier 140 could, but need not, be omitted. Moreover, as shown in FIG. 21B, the frontal portion 134c of the housing includes rounded inner and outer edges 142 and 144 to facilitate forward movement of the apparatus on the air cushion created by the impeller.

FIG. 22 shows another embodiment of the invention wherein the plate member 17 includes a modified structure. The plate member has a semicircular-shaped opening 154 extending along an arc of approximately 180 degrees in a first portion thereof. The plate also includes a plurality of circular openings 156, the respective centers of which lie along an arc of approximately 180 degrees, located in a second predetermined portion thereof. The plate member further supports (by suitable attachment means) a plurality of curved barrier diverters 158 selectively positioned around the periphery of the housing for diverting the cut grass clippings back into the path of the cutting blade. A triangular-shaped barrier 160 is also preferably supported on the plate member adjacent the frontal portion of the housing. After the cuttings have been recycled into the blade, eventually they will be discharged through the opening 154 and returned back into the ground. A vacuum module can also be supported on the apparatus for vacuuming if desired. Although not shown in detail, the barrier 160 may be replaced with a spiral-shaped diverter to deliver the cut clippings downwardly and into the soil area for recycling and recut thereof.

Referring now to FIG. 23, in an alternate embodiment of FIG. 11, the vacuum module means includes a separate motor means for driving one or more auger-type brushes 151 or tines to stir-up the cut and recycled grass clippings and thus enhance the vacuuming operation. The brush 151 is preferably of the bristle-type and is located just above the vacuum slot. In particular, and as best seen in FIG. 23A, the vacuum module means includes the rear deck 114 having the rounded trailing edge 116 and the bottom plate 153. The bottom plate 153 of the vacuum module is elevated slightly with respect to the main plate member 17 of the mower, and the bristle brush 151 is located substantially as shown. This construction advantageously enables the rear-mounted vacuum chamber to be used in a cleanup mode for any of the previously cut grass clippings 151 which have not been forcefully thrown into the ground by the frontal mulch recycling module. The bristle brush is rotated in a clockwise direction and penetrates a small distance (approximately ⅜") into the cut grass clippings 155 thereby allowing the brush 151 to maintain a constant contact with the grass and thus act as a self-propelled drive means for the mower. In particular, due to the constant contact between the brush and the clippings, (and the non-frictional gliding of the mower), the clockwise rotation of the brush promotes advancement of the hovering mower in a straight swath while simultaneously vacuuming the clippings as previously described.

As also seen in FIG. 23, the air-floated apparatus may support the fertilizer or enzyme applicator 56 on the housing itself or on the shroud that forms the vacuum chamber. In this embodiment, an orifice 157 interconnects the applicator 56 to the vacuum chamber 114. The orifice 157 includes an adjustable valve to enable injection of the material into the vacuum stream; alternatively, the vacuum force itself (created by the impeller) is used to suction the material through the orifice 157 and into the vacuum chamber. The applicator will also include an air inlet on the cap thereof. In either case, the material is supplied to the recycled clippings.

Additionally, the lawn mower preferably includes a vacuum clean-out 161 including a threaded removable cap 163. Upon removal of the cap, a water hose can be placed in or connected to the clean-out while the impeller is rotating. The vacuum force created by the impeller suctions the water into the interior of the housing and throws the water forcibly outward within the centrifuge chamber to effect a thorough clean-out of the impeller, the blade and the rest of the housing. This feature is especially advantageous and safe because it enables the mower to be cleaned without turning the housing over to access the blade.

Referring now to FIG.'s 24 and 25, a lawn mower 170 is depicted. Mower 170 is substantially the same as the air-floated lawn mower 10 shown and described with reference to FIG.'s 1 and 2, except that housing 12 of mower 170 is preferably supported by four wheels 172, two of which are shown in FIG. 24 and one of which is shown in FIG. 25.

Referring to FIG. 26, a lawn mower 174 is shown. Mower 174 is substantially the same as the lawn mower shown in FIG. 3, except that housing 12 of mower 174 is preferably supported by four wheels 176, two of which are shown in FIG. 25.

Referring to FIG. 27, a lawn mower 178 is shown. Mower 178 is substantially the same as mower 110, depicted in FIG. 11, except that housing 12 of mower 178 is preferably supported by four wheels 180, two of which are shown in FIG. 26.

Referring to FIG. 28, a lawn mower 182 is shown. Mower 182 is substantially the same as the lawn mower shown in FIG.'s 15 and 16, except that mower 182 is supported by four wheels 184, two of which are shown in FIG. 28.

Referring to FIG. 29, a lawn mower 186 is shown. Mower 186 is substantially the same as the lawn mower shown in FIG.'s 15 and 16, except that mower 186 is supported by front and back rollers 180 and 190, respectively. The use of support rollers 188 and 190 in lieu of four wheels has the advantage of allowing the mower 186 to traverse holes and other low spots in which conventional wheels may become lodged because rollers 188 and 190 are of sufficient length to be able to bridge across many holes and low spots. Rollers 188 and 190 are preferably filled with a liquid ballast material for stability. Plate 17 has enlarged portions 17a, 17b, 17c and 17d to inhibit access to the cutting blade 16 by an object (such as a person's foot) penetrating beneath housing 12.

The mulch recycling system described above with reference to the air-floated lawn mowers shown in FIG.'s 1–23A is equally applicable for use in non-air-floated lawn mowers, such as the wheel-supported lawn mowers shown in FIG.'s 24–28 and the roller-supported lawn mower shown in FIG. 29. The impeller 14 increases air pressure within the mower housing 12, which enhances centrifugal movement of the cuttings within housing 12. The centrifuge effect is further enhanced by the inwardly directed plate 17, which provides a support shelf for the cuttings centrifuged within housing 12. Plate 17 also functions as a "mulching plate," to direct cuttings to a frontal portion of the mower for application to the soil. As previously described, plate 17 may be configured with diverter barriers 125 to divert clippings back into the path of blade 16 for further cutting.

The combination of the impeller 14 and plate 17 significantly enhances the mulching capability of the cutting apparatus. The increased air pressure within housing 12 provided by impeller 14 accelerates the cuttings toward the front portion of housing 12 where the cuttings are applied as mulch to the soil. The increased pressure provided by impeller enhances the delivery of the cuttings to the soil under pressure. As previously mentioned, plate 17 provides a support shelf for the centrifuged cuttings, to prevent cuttings from falling to the soil beneath housing 12, so that most of the cuttings are delivered to the front of the mower for delivery to the soil as mulch after the cuttings have been cut to a sufficiently small size. The diverter barriers carried on plate 17 direct cuttings back to the blade 16 for recutting. Plate 17 also directs air inwardly within housing 12 to lift the grass upwardly for better cutting and to inhibit the loss of air pressure from housing 12.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A cutting apparatus, comprising:
 a substantially endless housing having an open bottom, an air intake opening and a discharge port;
 projection means projecting inwardly from a bottom part of said housing, said housing cooperating with said projection means to define a substantially enclosed centrifuge chamber;
 rotatable cutting means mounted in the housing; and
 recycle means attached to the discharge port for receiving cuttings produced by the rotatable cutting means and delivering said cuttings to a predetermined location adjacent said endless housing for mulching.

2. The apparatus of claim 1 wherein said recycle means includes applicator means for treating the cuttings to facilitate composting and fermentation thereof following delivery to a support surface.

3. The apparatus of claim 1 wherein said recycle means includes means for directing cuttings to a front portion of said housing.

4. The apparatus of claim 1 wherein said recycle means includes a rake module for facilitating dispersion of the cuttings at a predetermined location.

5. The apparatus of claim 4 wherein said rake module includes a plurality of spring-like tines.

6. The apparatus of claim 1 wherein said cutting means includes a rotatable support plate and a plurality of cutting blades, each of said cutting blades being mounted for swivel movement on the support plate as the support plate is rotated.

7. The apparatus of claim 6 wherein at least one of the cutting blades is mounted at a different horizontal position from the other cutting blades.

8. The apparatus of claim 1 further including means supported in the centrifuge chamber for accelerating movement of the cuttings within the centrifuge chamber.

9. The apparatus of claim 1 further including pressurizing means for pressurizing air in the housing, the operation of said pressurizing means enhancing the centrifugal movement of cuttings within the housing.

10. The apparatus of claim 1 further including a plurality of rotatable wheels for elevating said housing above a support surface, the rotation of said wheels transporting said apparatus along said support surface.

11. The apparatus of claim 1 further including a plurality of rotatable roller members for elevating said housing above a support surface, the rotation of said roller members transporting said apparatus along said support surface.

12. The apparatus of claim 11 wherein said plurality of roller members is comprised of respective front and rear elongated rollers, said front roller spanning substantially the entire width of a front portion of said housing and said rear roller spanning substantially the entire width of a rear portion of said housing.

13. The apparatus of claim 1 wherein said recycle means further includes diverter means for diverting at least some of the cuttings inwardly toward said cutting means for finer cutting.

14. The apparatus of claim 1 further including impeller means mounted for co-rotation with said cutting means for pressurizing air in said housing.

15. The apparatus of claim 1 wherein said cutting means includes a rotatable support plate, a plurality of cutting members mounted for co-rotation with said support plate, and a ring circumscribing said support plate and mounted for co-rotation therewith, respective distal ends of said cutting members being located between said support plate and said ring.

16. The apparatus of claim 15 wherein said ring has a vertically extending outer wall, said outer wall extending below each of said cutting members to inhibit access to said cutting members.

17. The apparatus of claim 15 further including a plurality of radial spokes connecting said ring and said support plate and lifting means carried on each of said spokes for directing air upwardly as said support plate, said ring and said spokes are rotated.

18. The apparatus of claim 1 wherein said cutting means includes a rotatable support plate, a ring circumscribing said support plate and mounted for co-rotation therewith, and a plurality of cutting members mounted for co-rotation with said ring, at least a portion of each cutting member projecting outwardly from said ring.

19. The apparatus of claim 18 wherein said ring has a vertically extending outer wall, said cutting members being circumferentially spaced around said ring and being mounted with said ring at respective discrete positions along the height of said outer wall.

20. The apparatus of claim 19 wherein said outer wall has at least one slot formed therein intermediate respective top and bottom surfaces of said ring to accommodate at least one cutting member at an intermediate position with respect to the height of said outer wall.

21. The apparatus of claim 1 further including pressurizing means for pressurizing air in said housing and vacuum module means operatively coupled to a vacuum side of said pressurizing means for vacuuming cuttings that are not delivered to said predetermined location adjacent said housing.

22. The apparatus of claim 21 wherein said vacuum module means includes a vacuum chamber, a port communicating with said vacuum chamber a rotatable cutting member located in said vacuum chamber and closure means for isolating said vacuum chamber from a support surface beneath the housing, said port being adapted to receive a conduit, whereby material is suctioned by said pressurizing means through said conduit into said vacuum chamber when said vacuum chamber is isolated from said support surface by said closure means, said cutting member being operable for cutting the material sucked into said vacuum chamber before said material is suctioned into said centrifuge chamber by said pressurizing means.

23. A cutting apparatus for simultaneously cutting and mulching vegetation as the apparatus is advanced in a forward direction, comprising:

a housing having an open bottom, an air intake opening and a discharge port, said housing having a frontal portion;

a plate member projecting inwardly from a bottom part of said housing, said housing cooperating with said plate member to define a substantially enclosed centrifuge chamber;

rotatable cutting means mounted in the housing for cutting vegetation and for throwing the cuttings outwardly in the centrifuge chamber as the cutting means rotates, said cuttings being transported in the centrifuge chamber to the discharge port;

pressurizing means for pressurizing air in the housing, said pressurizing means accelerating the movement of said cuttings in the centrifuge chamber to the discharge port; and recycle means attached to the discharge port for receiving the cuttings and delivering the cuttings to said frontal portion, said cuttings being delivered to a support surface beneath the housing as the apparatus is advanced in the forward direction.

24. The apparatus of claim 23 further including a plurality of rotatable wheels for supporting said housing, said apparatus being advanced in the forward direction by the rotational movement of said wheels.

25. The apparatus of claim 23 further including a plurality of rotatable roller members for supporting said housing, said apparatus being advanced in the forward direction by the rotational movement of said roller members.

26. The apparatus of claim 25 wherein said plurality of roller members include opposed front and rear elongated roller members, said front roller member extending substantially the entire width of said frontal portion and said rear roller member extending substantially the entire width of a rear portion of said housing.

27. The apparatus of claim 23 further including vacuum module means operatively coupled to a vacuum side of the pressurizing means for vacuuming cuttings that are not delivered to the support surface by the recycle means.

28. The apparatus of claim 27 wherein said vacuum module means includes a vacuum chamber, said apparatus further including clean-out means in communication with the vacuum chamber to facilitate cleaning of the pressurizing means.

29. The apparatus of claim 27 wherein said vacuum module means further includes an agitator brush and means for rotating said agitator brush.

30. The apparatus of claim 23 further including at least one barrier located on said plate member for diverting cuttings back into the cutting means for recut.

* * * * *